(12) United States Patent
Crockett et al.

(10) Patent No.: US 7,391,859 B2
(45) Date of Patent: Jun. 24, 2008

(54) METHOD AND SYSTEM FOR PROVIDING ENHANCED CALL WAITING

(75) Inventors: Susanne Marie Crockett, Buffalo Grove, IL (US); James Thomas Maciejewski, Spring Grove, IL (US); Claude Lee Harrington, Indianapolis, IN (US); Nancy Ann Book, Naperville, IL (US); Mary Louise Hardzinski, Palatine, IL (US); Robert Wesley Bossemeyer, Jr., St. Charles, IL (US); Thomas Joseph McBlain, Arlington Heights, IL (US)

(73) Assignee: SBC Properties, L.P., Reno, NV (US)

( * ) Notice: Subject to any disclaimer, the term of this patent is extended or adjusted under 35 U.S.C. 154(b) by 63 days.

(21) Appl. No.: 10/626,492

(22) Filed: Jul. 23, 2003

(65) Prior Publication Data
US 2004/0137883 A1    Jul. 15, 2004

Related U.S. Application Data

(63) Continuation of application No. 09/425,476, filed on Oct. 22, 1999, now Pat. No. 6,633,634, which is a continuation-in-part of application No. 09/044,574, filed on Mar. 19, 1998, now Pat. No. 6,219,414.

(51) Int. Cl.
*H04M 3/42* (2006.01)
*H04M 7/00* (2006.01)

(52) U.S. Cl. ............ 379/215.01; 379/201.07; 379/221.1

(58) Field of Classification Search ........... 379/88.12, 379/215.01, 221.08, 421.01, 67.1, 201.07, 379/207.05, 207.15, 221.1; 455/461, 415
See application file for complete search history.

(56) References Cited

U.S. PATENT DOCUMENTS

| | | | | |
|---|---|---|---|---|
| 5,636,269 A * | 6/1997 | Eisdorfer | ............... | 379/215.01 |
| 5,729,592 A * | 3/1998 | Frech et al. | ............. | 379/88.09 |
| 5,943,397 A * | 8/1999 | Gabin et al. | ............... | 379/67.1 |
| 5,946,386 A * | 8/1999 | Rogers et al. | .......... | 379/265.09 |
| 5,999,611 A * | 12/1999 | Tatchell et al. | ......... | 379/211.02 |
| 6,006,098 A * | 12/1999 | Rathnasabapathy et al. | . | 455/461 |
| 6,061,560 A * | 5/2000 | Saboorian et al. | ........... | 455/415 |
| 6,233,325 B1 * | 5/2001 | Frech et al. | ............ | 379/142.06 |
| 6,891,939 B1 * | 5/2005 | Urban et al. | ........... | 379/142.01 |
| 7,079,853 B2 * | 7/2006 | Rathnasabapathy et al. | . | 455/461 |
| 2003/0199281 A1 * | 10/2003 | Rathnasabapathy et al. | . | 455/461 |
| 2006/0056610 A1 * | 3/2006 | Urban et al. | ........... | 379/142.01 |

* cited by examiner

*Primary Examiner*—Thjuan K. Addy
(74) *Attorney, Agent, or Firm*—Brinks Hofer Gilson & Lione

(57) ABSTRACT

A method and system are disclosed for providing an enhanced call waiting message to a customer when the customer is busy on a previous call and receives a current call. The call waiting message preferably includes a call waiting indicator and an audible representation of information associated with a current calling party. The call waiting message alerts the customer that a current call is waiting and provides the customer with information that assists the customer in deciding whether or not to take the current call. The call waiting indicator and the information associated with a current calling party are automatically transmitted to the customer without any customer commands.

21 Claims, 12 Drawing Sheets

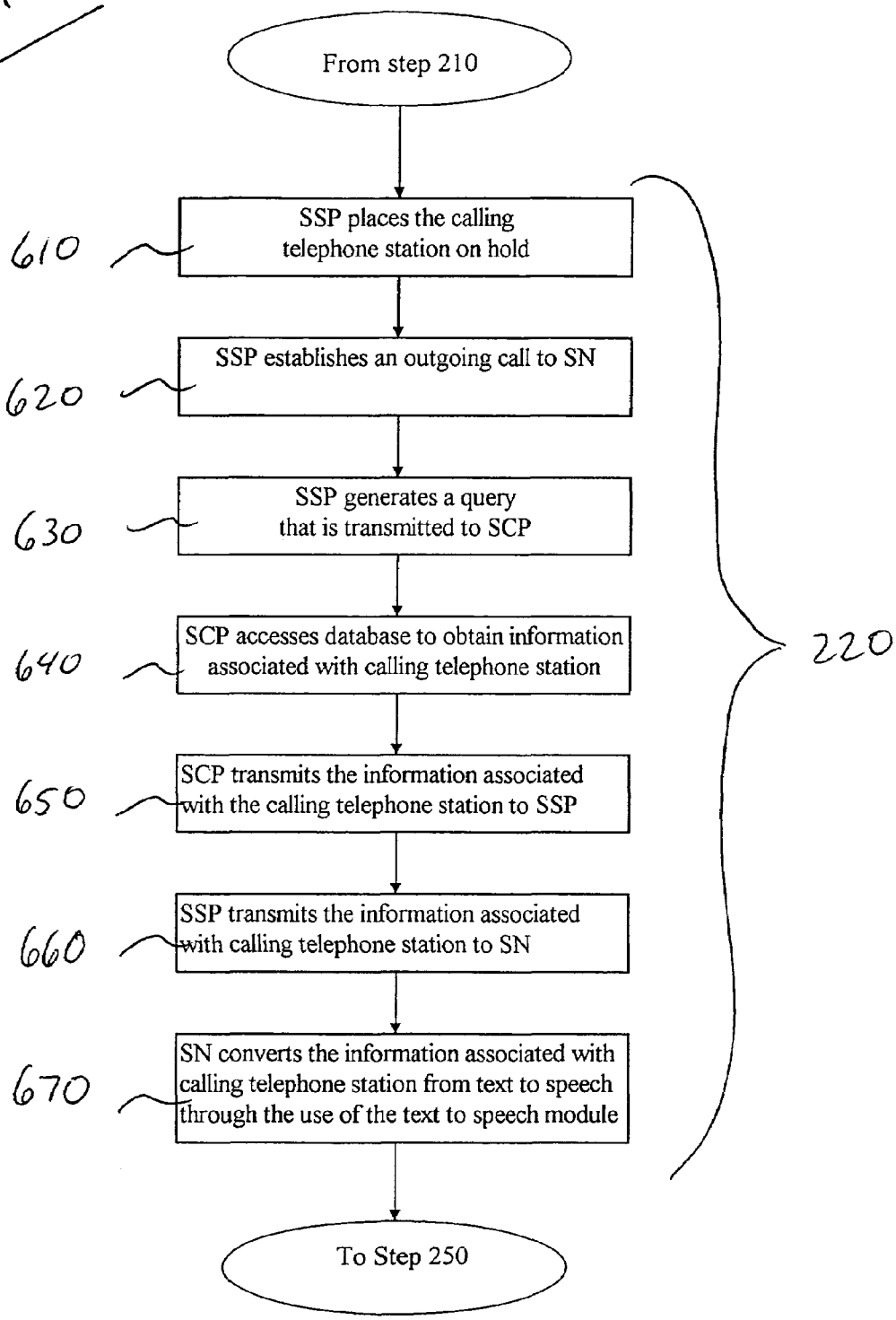

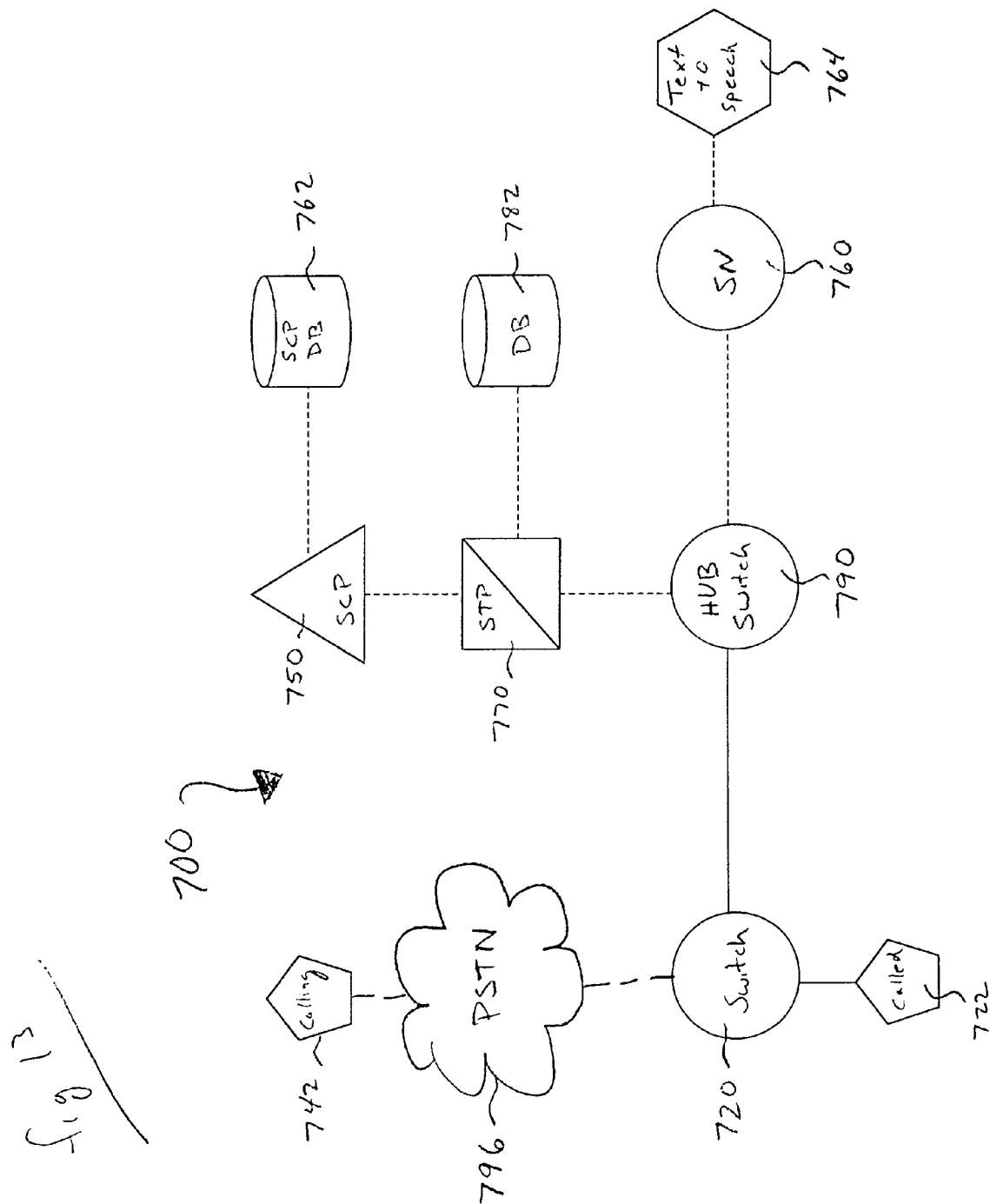

METHOD AND SYSTEM FOR PROVIDING ENHANCED CALL WAITING

RELATED APPLICATION

This application is a continuation of application Ser. No. 09/425,476, filed Oct. 22, 1999 now U.S. Pat. No. 6,633,634, which is a continuation in part of application Ser. No. 09/044,574, filed Mar. 19, 1998 now U.S. Pat. No. 6,219,414, which are both hereby incorporated by reference herein.

BACKGROUND

The present invention relates generally to telecommunications call processing and more particularly to call waiting service features.

Call waiting services are offered by numerous service providers and are well known by those skilled in the art. Call waiting services generally notify a customer that is busy on a previous call that a current call has been placed to the customer. Call waiting services commonly utilize an audible tone that is transmitted to the customer, to notify the customer that the current call is waiting. When the customer is notified that the current call is waiting, the customer can decide whether or not to suspend the previous call to take the current call. Accordingly, information about the current call aids in the customer's decision. U.S. Pat. No. 4,899,358 describes a system that provides an audible representation of the calling party's name to notify a customer that a call is waiting. This system substitutes the name in place of the tone commonly used to notify the customer. While substitution of the name in place of the tone provides the customer with additional information, delivering information in this format can result in confusion for the customer. For example, providing just the name of a caller can be confusing when the name is interjected in the middle of a conversation without warning.

Other systems provide additional information to the customer in varying formats. U.S. Pat. No. 5,309,512 describes a system that first provides a tone to indicate that a current call is waiting and then waits for a command from the customer. This system only provides the name of the calling party after receiving the command. To provide the required command, the customer completes a flash hook at his telephone station. The flash hook puts the previous caller on hold for a significant amount of time while the customer hears the name of the current caller and then decides whether or not to take the current call. Providing information in this format also creates additional problems for the customer. For example, the customer is not immediately provided with the information necessary to decide whether or not to take the current call. This results in an inconvenience for the both the previous caller and the customer, especially if the customer ultimately decides not to take the current call and returns to the previous call after a significant delay in the call.

BRIEF DESCRIPTION OF THE DRAWINGS

FIG. 12 is a more detailed flow chart of the method depicted in FIG. 4.

FIG. 13 is more detailed block diagram of the system depicted in FIG. 1.

DETAILED DESCRIPTION OF THE PRESENTLY PREFERRED EMBODIMENTS

Figure 1:
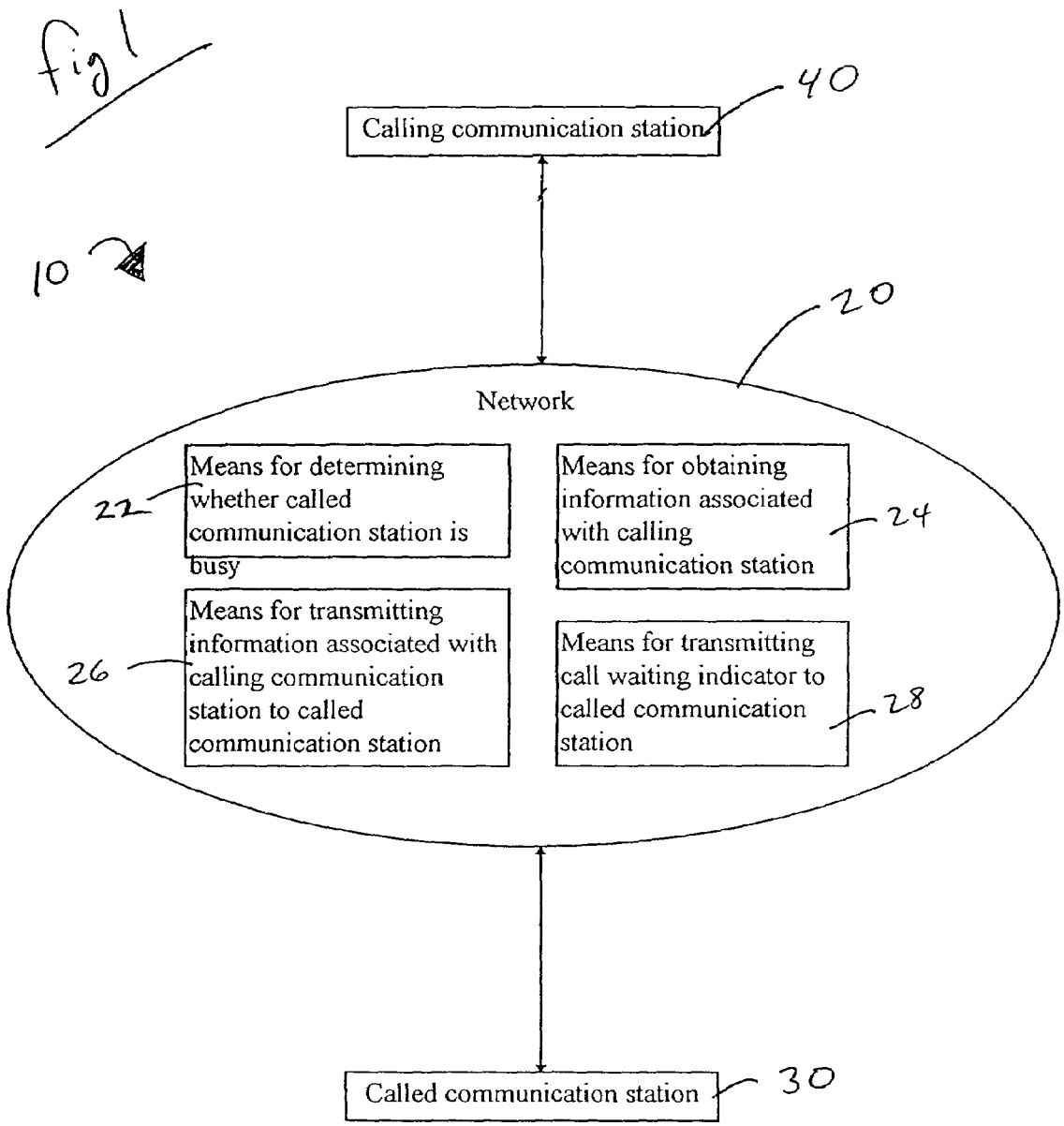
FIG. 1 is a block diagram of a system for processing a telephone call of a preferred embodiment.

By way of example, FIG. 1 depicts a system 10 of a preferred embodiment. The system 10 comprises a network 20, a called communication station 30 connected with the network 20 and a calling communication station 40 connected with the network 20. The network 20 preferably comprises: means for determining whether the called communication station is busy 22, means for obtaining information associated with the calling communication station 24; means for transmitting the information associated with the calling communication station to the called communication station 26; and means for transmitting a call waiting indicator to the called communication station 28.

The system 10 is preferably implemented in a telecommunications network as known by those skilled in the art. Alternatively, the system 10 can be implemented in computer network or any other network that is adapted to store and retrieve information. Each of the means 22, 24, 26, 28 described above is preferably implemented through the use of computer readable program code written in any suitable programming language and implemented on an analog or digital computer utilizing any suitable operating system as known by those skilled in the art. Alternatively, each of the means 22, 24, 26, 28 can be implemented through the use of hardware in the form of a hardwired computer, an integrated circuit, or a combination of hardware and computer readable program code as known by those skilled in the art. The calling communication station 40 and the called communication station 30 preferably comprise an analog telephone station as known by those skilled in the art. According to an alternative embodiment, the communication stations 30, 40 can comprise any suitable communication station adapted for use in the present embodiments as known by those skilled in the art.

The system 10 enables a customer at the called communication station 30, who is busy on a previous call, to be efficiently and effectively notified that a current call from calling communication station 40 is waiting. The system 10 provides an enhanced call waiting message that includes both the call waiting indicator and the audible representation of information associated with the calling communication station 40. The call waiting indicator and the audible representation of information associated with the calling communication station can be automatically transmitted to the called communication station 30 prior to any commands from the customer. The combination of the call waiting indicator and the information associated with the calling communication station alerts the customer that the current call is waiting and provides the customer with information that assists the customer in deciding whether to take the current call.

Figure 2:
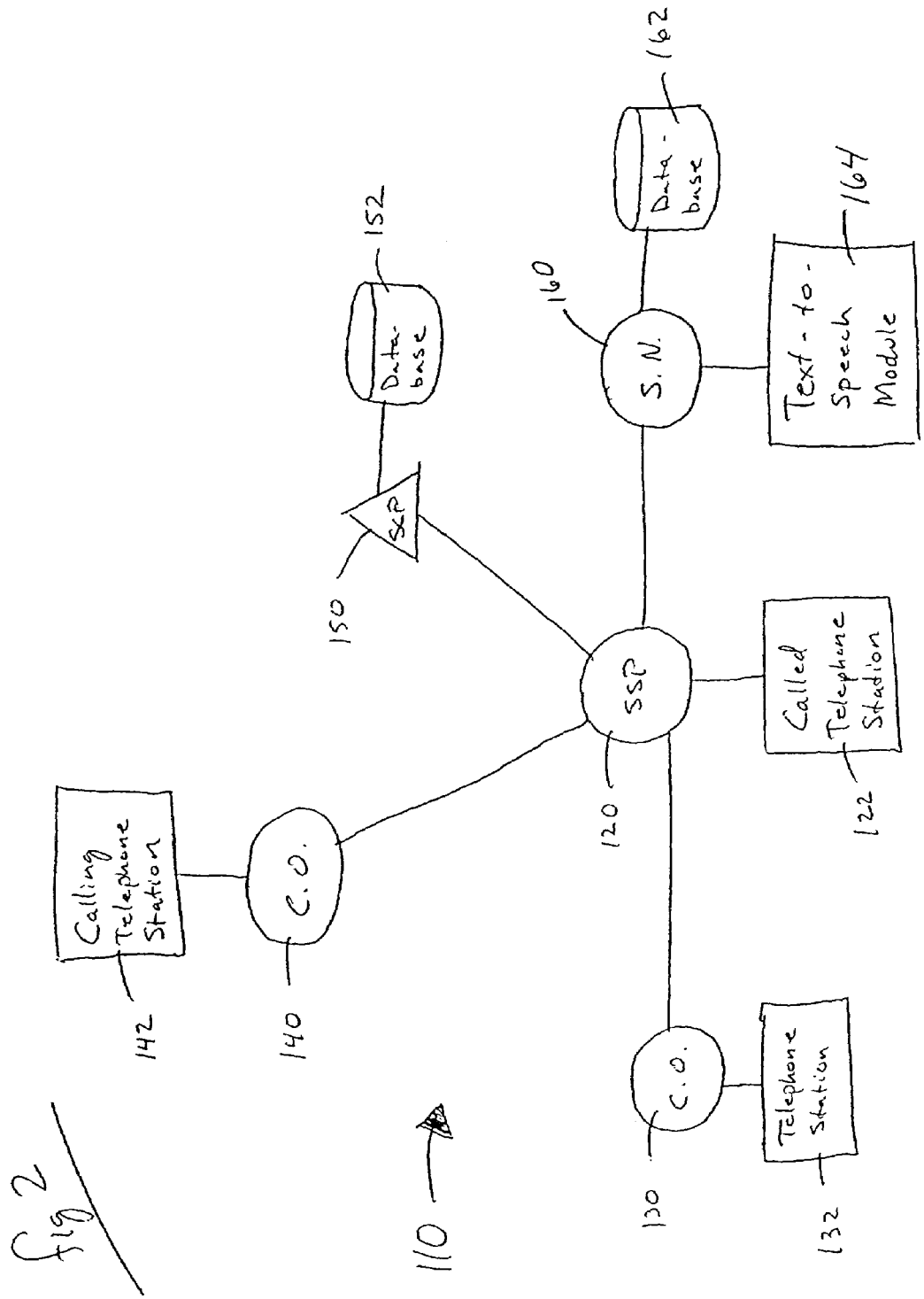
FIG. 2 is more detailed block diagram of the system depicted in FIG. 1.

By way of further example, FIG. 2 depicts a preferred embodiment of the system described above. The system 110 comprises a service switching point (SSP) 120, a service control point (SCP) 150, an SCP database 152, a service node (SN) 160, a database 162, central offices 130, 140 and telephone stations 122, 132, 142. Intelligent network system components, commonly referred to as advanced intelligent network (AIN) components, suitable for implementing the present embodiment are commercially available from Lucent Technologies and are well know by those skilled in the art. AIN components can implement computer readable program code as known by those skilled in the art. Vendors of AIN components typically have a preferred programming language and operating platform as known by those skilled in the art.

SSP 120 preferably comprises an AIN switch that routes calls, generates queries to SCP 150 to obtain call control information and responds to call control information. SSP 120 connects called telephone station 122 with central offices 130, 140 to enable a customer at called telephone station 122 to place calls to and receive calls from telephone stations 132, 142. SSP 120 preferably communicates with SCP 150, central offices 130, 140, and SN 160 in accordance with a signaling protocol such as Signaling System 7 (SS7) or other such signaling protocols as known by those skilled in the art.

SCP 150 preferably comprises an AIN element that stores call control information in SCP database 152 and accesses the stored call control information. SCP 150 receives queries generated by SSP 120 and preferably responds to the queries by performing database searches to locate the requested call control information. SCP 150 can forward the located call control information to SSP 120. SCP 150 preferably comprises an AIN element as well known by those skilled in the art.

SN 160 preferably comprises a network element that stores call control information and performs call related functions as known by those skilled in the art. SN 160 receives calls forwarded from SSP 120, performs searches or other requested functions and returns information or data to SSP 120. In an alternate embodiment, SN 160 can be configured to produce call waiting indicators as described herein. SN 160 preferably includes a text to speech module 164 that performs text to speech conversions to produce an audible representation of the text. Such modules and conversions are well known by those skilled in the art.

Database 152 preferably comprises a data storage element for use with SCP 150 as well known by those skilled in the art. Database 152 preferably stores call control information that can be implemented by SSP 120 to control calls. Such call control information is well known by those skilled in the art.

Database 162 preferably comprises a caller identification with name database as known by those skilled in the art. Database 162 preferably stores information associated with a telephone number that is associated with calling telephone station 142. The information associated with the telephone number preferably comprises the identity of a caller in the form of the caller's name. Alternatively, the information associated with the telephone number can comprise the identity of a caller in the form of the caller's name and the telephone number for calling telephone station 142. The telephone number preferably comprises a 10 digit telephone number as known by those skilled in the art but can also comprise any type of identification format used to identify telephone stations. Database 162 can alternatively comprise a caller assistance database as known by those skilled in the art. While database 162 is depicted within a telecommunications system, database 162 can comprise any suitable database containing information adapted for use in the present embodiment and is not limited to databases located within a telecommunications network.

Central offices 140, 150 preferably comprise AIN network switches as well known by those skilled in the art. Central offices 140, 150 comprise network switches that connect telephone stations 132, 142 with SSP 120 to enable callers at telephone stations 132, 142 to place calls to and receive calls from the customer at called telephone station 122. Alternatively, central offices 140, 150 can comprise non-AIN network switches as known by those skilled in the art.

Telephone stations 122, 132, 142 preferably comprise analog telephone sets as known by those skilled in the art. Alternatively, telephone stations 122, 132, 142 can comprise wireless, PCN, ISDN or any other form of communication station known by those skilled in the art.

Figure 3:
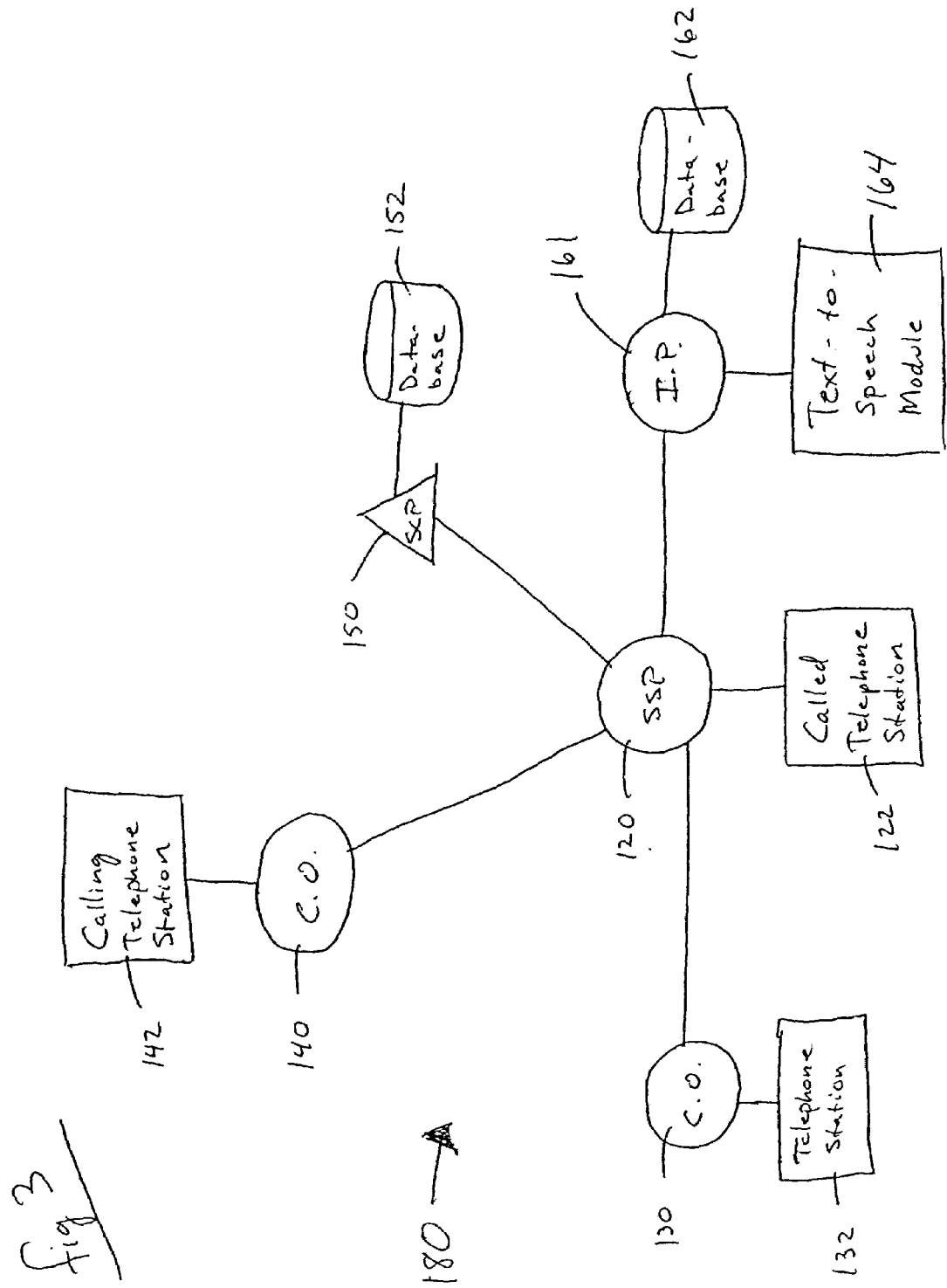
FIG. 3 is an alternate embodiment of the system depicted in FIG. 2.

Referring now to FIG. 3, an alternate embodiment of the system of FIG. 2 is shown. The system 180 comprises: an SSP 120; a called telephone station 122; central offices 130, 140; a telephone station 132; a calling telephone station 142; an SCP 150; an SCP database 152; a database 162; and a text-to-speech module 164 all as described above in reference to FIG. 2. The system also includes an intelligent peripheral (IP) 161 that communicates with SSP 120, database 162 and test-to-speech module 164 and performs the same functions as the SN 160 as described herein. The IP 161 preferably comprises an AIN element that acts on instructions from SCP 120. In an alternate embodiment, IP 161 can be configured to generate call waiting indicators as described herein.

Figure 4:
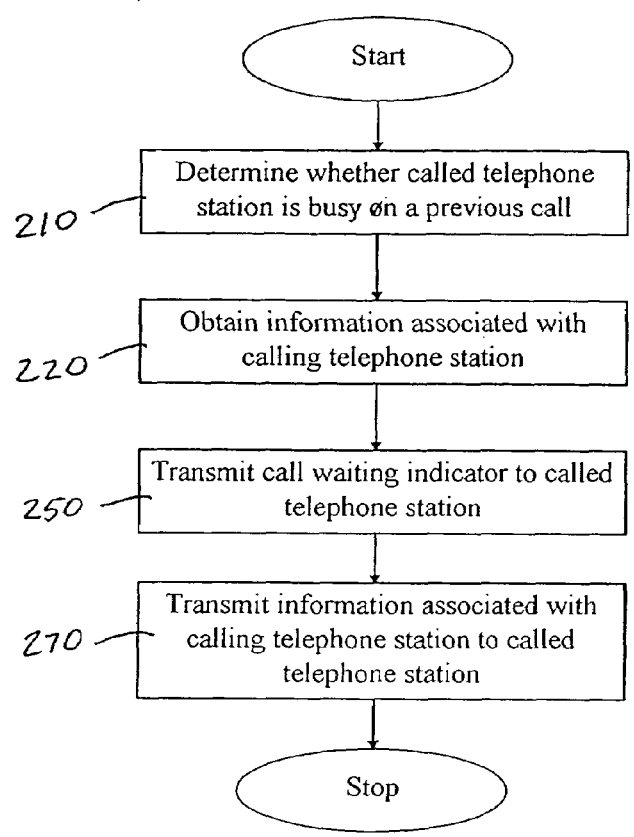
FIG. 4 is a flow chart of a method for processing a telephone call of a preferred embodiment.

The systems depicted in FIGS. 1, 2 and 3 can be utilized to implement the method 200 depicted in FIG. 4. For purposes of illustration, assume that a customer at called telephone station 122 (FIGS. 2, 3) is on a previous call with a previous calling party at telephone station 132. Connections are established between: telephone station 132 and central office 130; central office 130 and SSP 120; and SSP 120 and called telephone station 122; to enable the previous call to be connected. Also, assume that after the previous call has been commenced, a current calling party at calling telephone station 142 places a current call to the customer at called telephone station 122. In an attempt to connect the current call, central office 140 routes the current call to SSP 120.

The method 200 of processing a current call from a calling telephone station 142 (FIGS. 2, 3) to a called telephone station 122 generally includes the steps of: determining whether the called telephone station is busy on a previous call (step 210, FIG. 4); obtaining information associated with the calling telephone station (step 220); transmitting a call waiting indicator to the called telephone station 122 to signify that the current call is waiting (step 250); and automatically transmitting the information associated with the calling telephone station (step 270) to the called telephone station 122. Each of these steps is discussed in more detail below.

Figure 5:
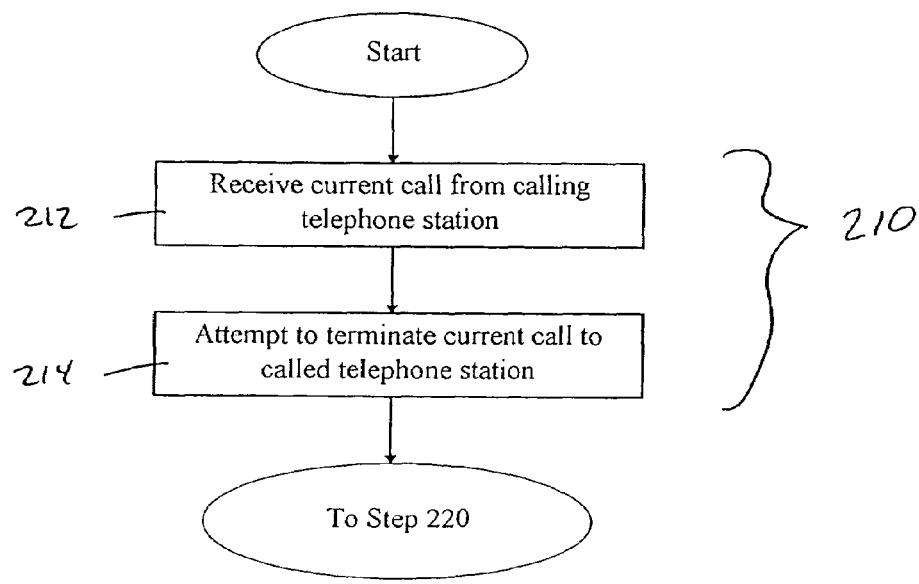
FIG. 5 is a more detailed flow chart of the method depicted in FIG. 4.

The step of determining whether the called telephone station is busy on a previous call (step 210, FIG. 4), preferably comprises the following steps as depicted in FIG. 5. SSP 120 receives the current call (step 212, FIG. 5) and attempts to terminate the call to called telephone station 122 (step 214). Because the customer at called telephone station 122 is busy on a previous call, the current call cannot be terminated to called telephone station 122 and SSP 120 determines that the customer at called telephone station 122 is busy on a previous call.

Figure 6:
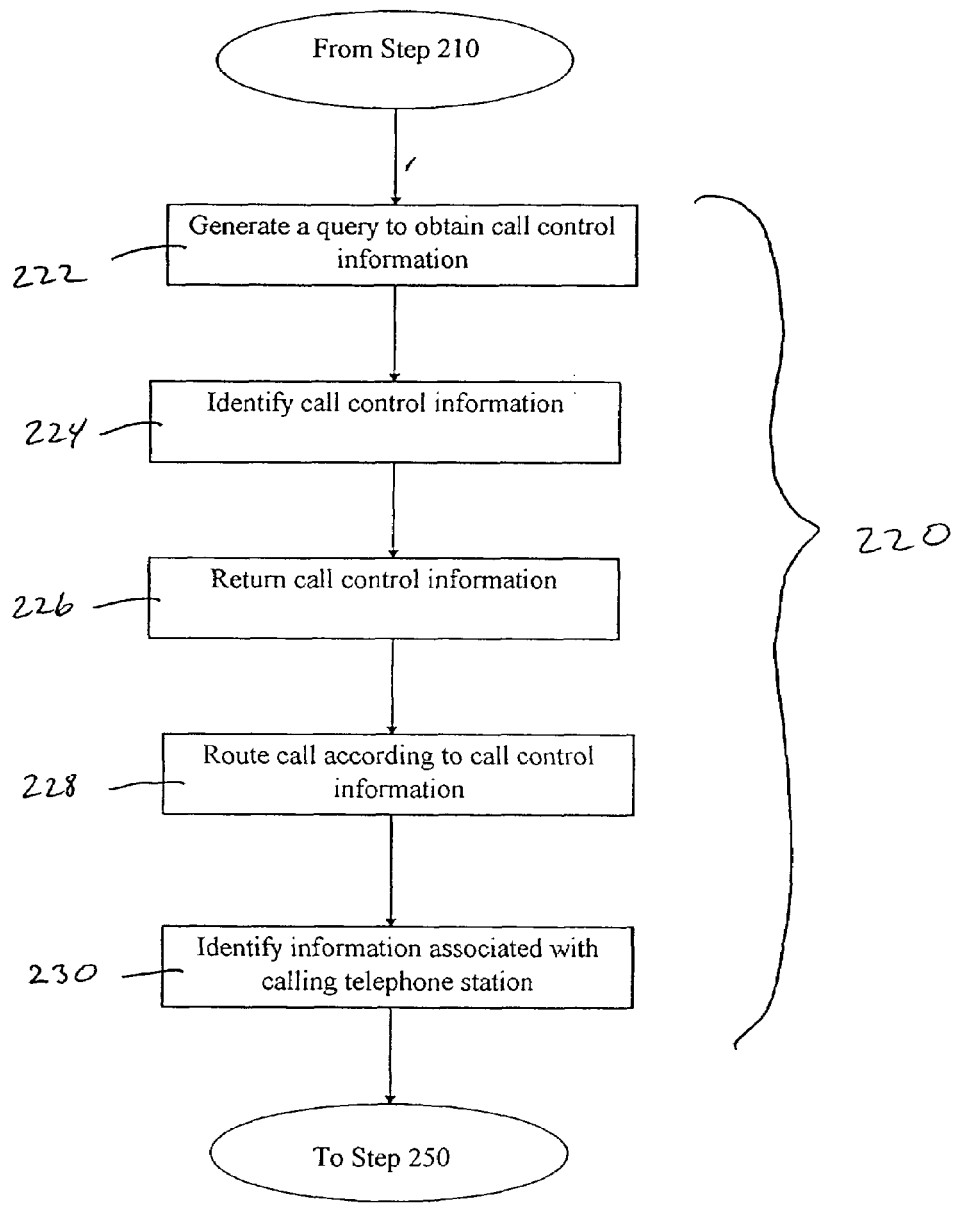
FIG. 6 is a more detailed flow chart of the method depicted in FIG. 4.

The step of obtaining information associated with the calling telephone station (step 220, FIG. 4) preferably comprises the following steps as depicted in FIG. 6. When SSP 120 determines that the customer at called telephone station 122 is busy on a previous call, SSP 120 generates a query to SCP 150 (step 222, FIG. 6) in accordance with a call forward on busy feature, or other similar function, to obtain call control information from SCP 150. Call forward on busy features and other similar functions are well known by those skilled in the art. The call control information instructs SSP 120 where to route the current call when called telephone station 122 is busy. After receiving the query from SSP 120, SCP 150 identifies the relevant call control information (step 224) and forwards it to SSP 120 (step 226). The relevant call control information has been created to enable SSP 120 to forward the current call to SN 160 or IP 161 when called telephone station 122 is busy. In accordance with the call control information, SSP 120 routes the current call to SN 160 or IP 161 (step 228). SN 160 or IP 161 examines the telephone number associated with calling telephone station 142 and identifies information corresponding to the telephone number by performing a database search (step 230). The information corresponding to the telephone number preferably comprises the identity of the current caller at calling telephone station 142 in the form of the name of the current caller. Database 162 preferably comprises a caller identification with name database as known by those skilled in the art. Alternatively, the database 162 can comprise a caller assistance database as known by those skilled in the art.

Figure 7:
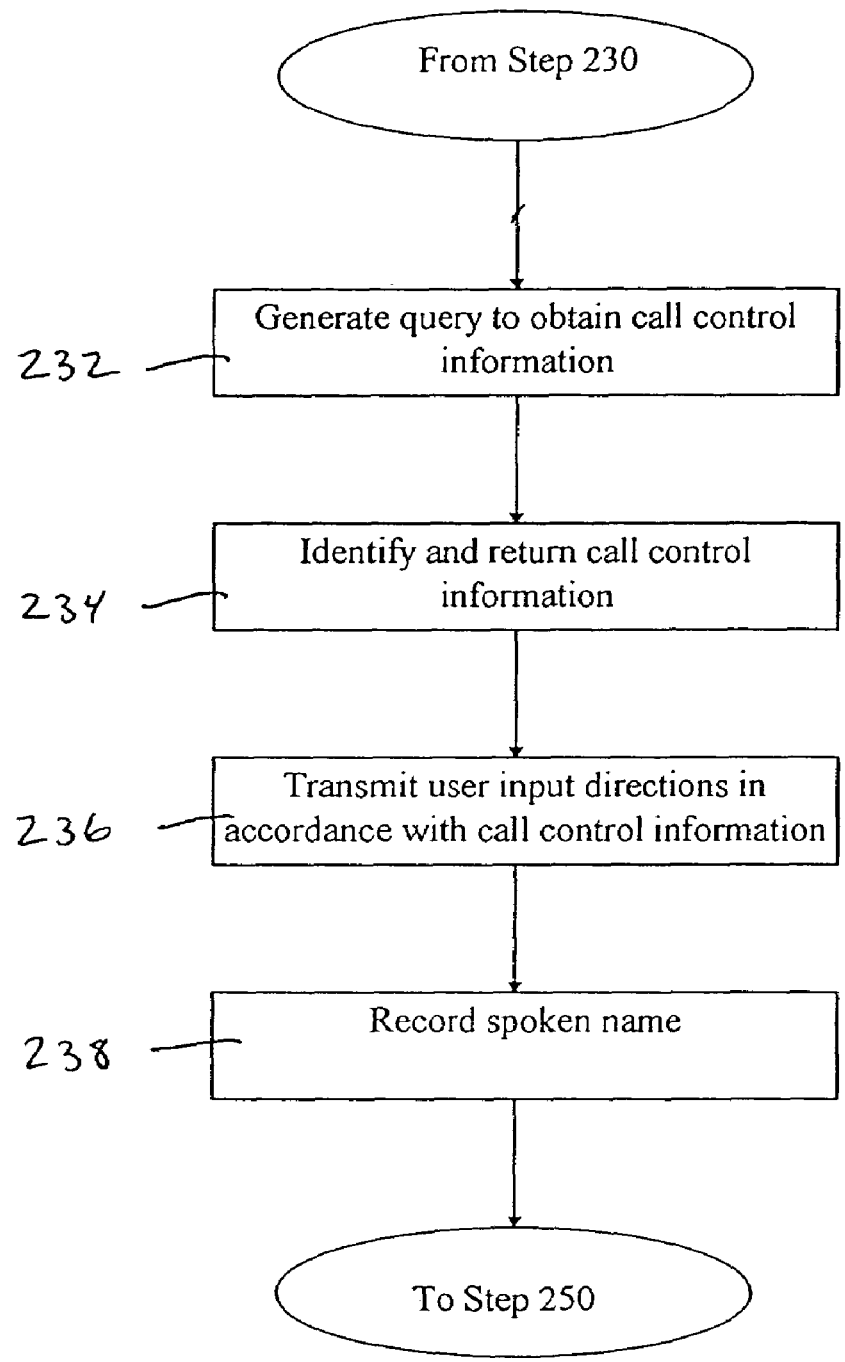
FIG. 7 is a more detailed flow chart of the method depicted in FIG. 4.

In accordance with an alternative embodiment, the step of obtaining information associated with the calling telephone station 142 (step 220, FIG. 4) further comprises the following steps as depicted in FIG. 7. If SN 160 or IP 161 cannot identify and return information associated with the telephone number, SSP 120 generates a query to SCP 150 (step 232, FIG. 7) requesting further call control information. SCP 150 locates and returns call control information to SSP 120 (step 234) that enables the creation of audible caller input directions that direct the calling party at calling telephone station 142 speak his or her name. SSP 120 transmits the caller input directions to calling telephone station 142 (step 236). When the calling party speaks their name, the spoken name is digitized and recorded by SN 160 or IP 161 (step 238). The recorded name can be played back to the customer at called telephone station 122 through the use of the speech processing capabilities of SN 160 or IP 161. SN 160 or IP 161 preferably provides the recorded name to the called telephone station 122 between the call waiting indicators as described herein.

According to an alternative of the above embodiment, when the caller at calling telephone station 142 speaks his or her name, the spoken name can be directly provided to the customer at called telephone station 122 through central office 140 and SSP 120. The name is preferably provided between the call waiting indicators as described herein.

In accordance with a further alternative embodiment, the step of obtaining information associated with the calling telephone station (step 220, FIG. 4) further comprises the following steps. When the user input directions, as described above, are transmitted to calling telephone station 142 (step 236, FIG. 7), additional user input instructions can be transmitted to calling telephone station 142. The additional user input instructions can request the calling party to provide additional information relating to the handling of and/or the content of the information associated with the calling telephone station 142. These directions preferably include requests for information from the calling party regarding the priority of the message to be delivered to called telephone station 122. For example, if the caller believes that the message is urgent, the caller may enter appropriate instructions that enable the SN 160 or IP 161 to generate standard or customized messages that are included in the information associated with calling telephone station 142 that is transmitted to called telephone station 122 (step 270, FIG. 4). The user can, for example, utilize a dual-tone-multi-frequency (DTMF) signal to provide information as known by those skilled in the art. This alternative can be implemented in conjunction with the methods depicted in FIGS. 6 and 7 and described herein.

In accordance with a further alternative embodiment, the step of obtaining information associated with calling telephone station 142 (step 206, FIG. 4) further comprises the following steps. When SSP 120 determines that called telephone station 122 is busy and generates a query to SCP 150 requesting call control information, SCP 150 identifies and returns call control information to SSP 120. The call control information directs SSP 120 to generate instructions that ask the calling party at calling telephone station 142 to speak his or her name. The instructions are sent to a caller at calling telephone station 142 without attempting to locate a name associated with the telephone number in a database. The spoken name can be recorded or delivered as described above.

Figure 8:
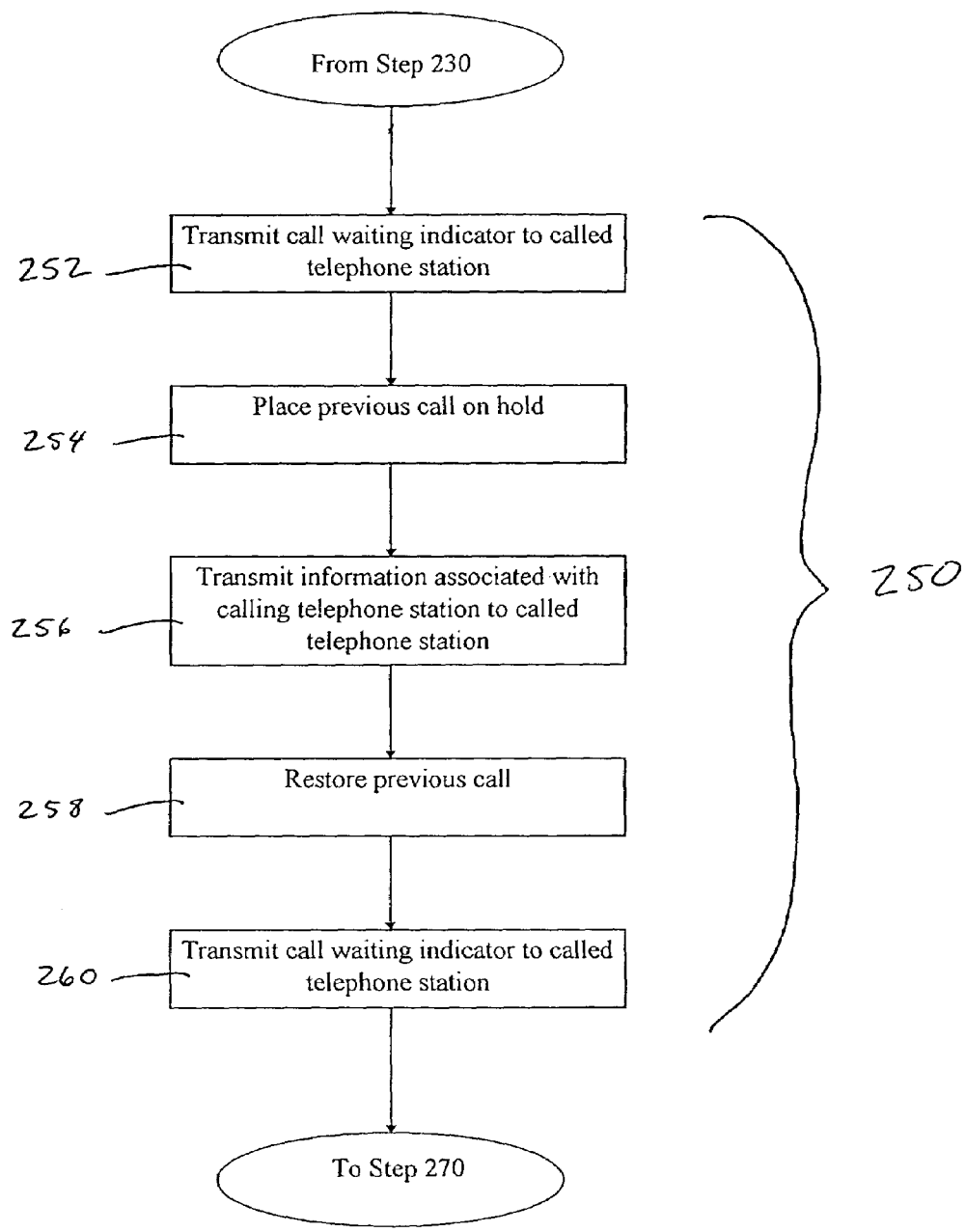
FIG. 8 is a more detailed flow chart of the method depicted in FIG. 4.

According to a preferred embodiment as depicted in FIG. 8, SSP 120 preferably generates the call waiting indicator comprising a tone or other similar indicator that is transmitted to called telephone station 122 to signify the start of the call waiting message (step 252, FIG. 8). The call path of the previous call is temporarily interrupted to temporarily place the previous call on hold (step 254) while the SN 160 or IP 161 automatically transmits an audible representation of the name associated with a caller at calling telephone station 142 to called telephone station 122 (step 256). SN 160 or IP 161 implements the text to speech module 164 to generate an audible representation of the name associated with calling telephone station 142. The audible representation of the name is preferably transmitted to called telephone station 122 within a predetermined amount of time after the call waiting indicator is transmitted. The previous call is restored after the name has been transmitted to called telephone station 122 (step 258). SSP 120 preferably generates a second call waiting indicator comprising a tone or other similar indicator that is sent to called telephone station 122 (step 260). The second call waiting indicator is preferably transmitted to called telephone station 122 within a predetermined amount of time after the name is transmitted. According to an alternative embodiment, the steps of transmitting a call waiting indicator (step 250, FIG. 4, steps 252, 260, FIG. 8) comprise transmitting a plurality of tones to called telephone station 122. According to a further alternative embodiment, the call waiting indicators are generated by SN 160 or IP 161 and transmitted to called telephone station 122.

According to an alternate embodiment, the information associated with calling telephone station 142, described in conjunction with FIGS. 4, 5, 6, 7 and 8 comprises the identity of a caller at calling telephone station 142 and the telephone number associated with calling telephone station 142.

Figure 9:
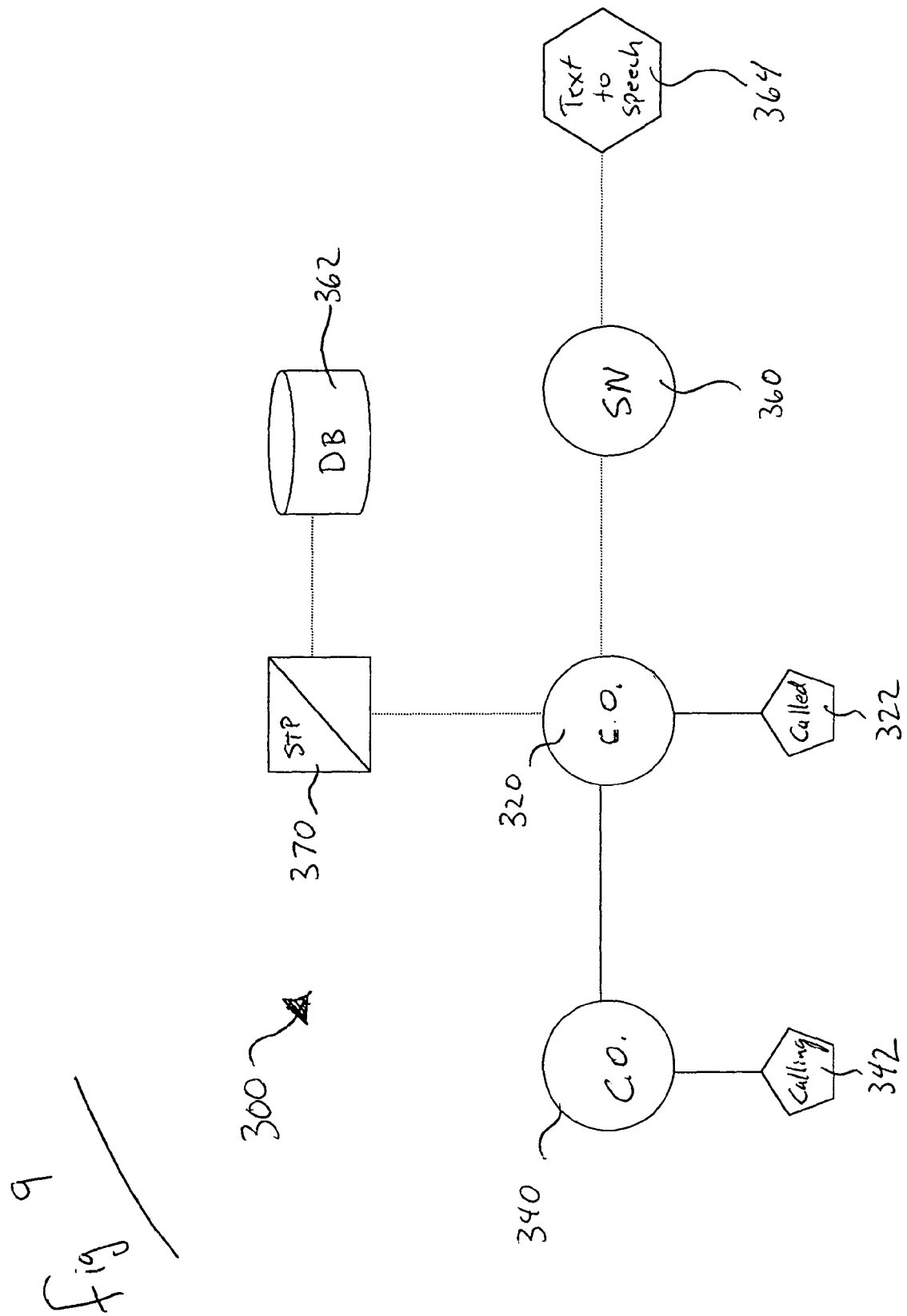
FIG. 9 is a more detailed block diagram of the system depicted in FIG. 1

Referring now to FIG. 9, a further alternative embodiment of the system of FIG. 1 is shown. The system 300 comprises a central office (CO) 320, a called telephone station 322, central office 340, a calling telephone station 342, a service node (SN) 360, a database 362, and a text-to-speech module 364, all as described above in reference to FIG. 2. In addition, the system 300 comprises a signal transfer point (STP) 370 that is coupled with the database 362 and the CO 320. The STP 370 receives, transfers, and routes signaling information within the system 300. The STP 370 can also receive queries from CO 320 and transmit the queries to the database 362 to access the information stored within database 362. The STP 370 can forward the information from the database 362 through the system 300. For example, the STP 370 can retrieve information associated with a telephone number from the database 362 to provide caller identification services to the called telephone station 322. The CO 320 preferably comprises a non-AIN switch that is preferably coupled with STP 370 and the SN 360 through the SS7 signaling protocol or the like. The CO 320 can alternatively be coupled with the SN 360 through a primary rate interface line (PRI) or the like. In an alternative embodiment, the CO 320 can comprise an AIN switch such as a service switching point as described herein. In a further alternative embodiment, an intelligent peripheral (IP) 361, as described above in reference to FIG. 3, can be used in place of the SN 360. This system 300 can be used to perform the method described below.

Figure 10:
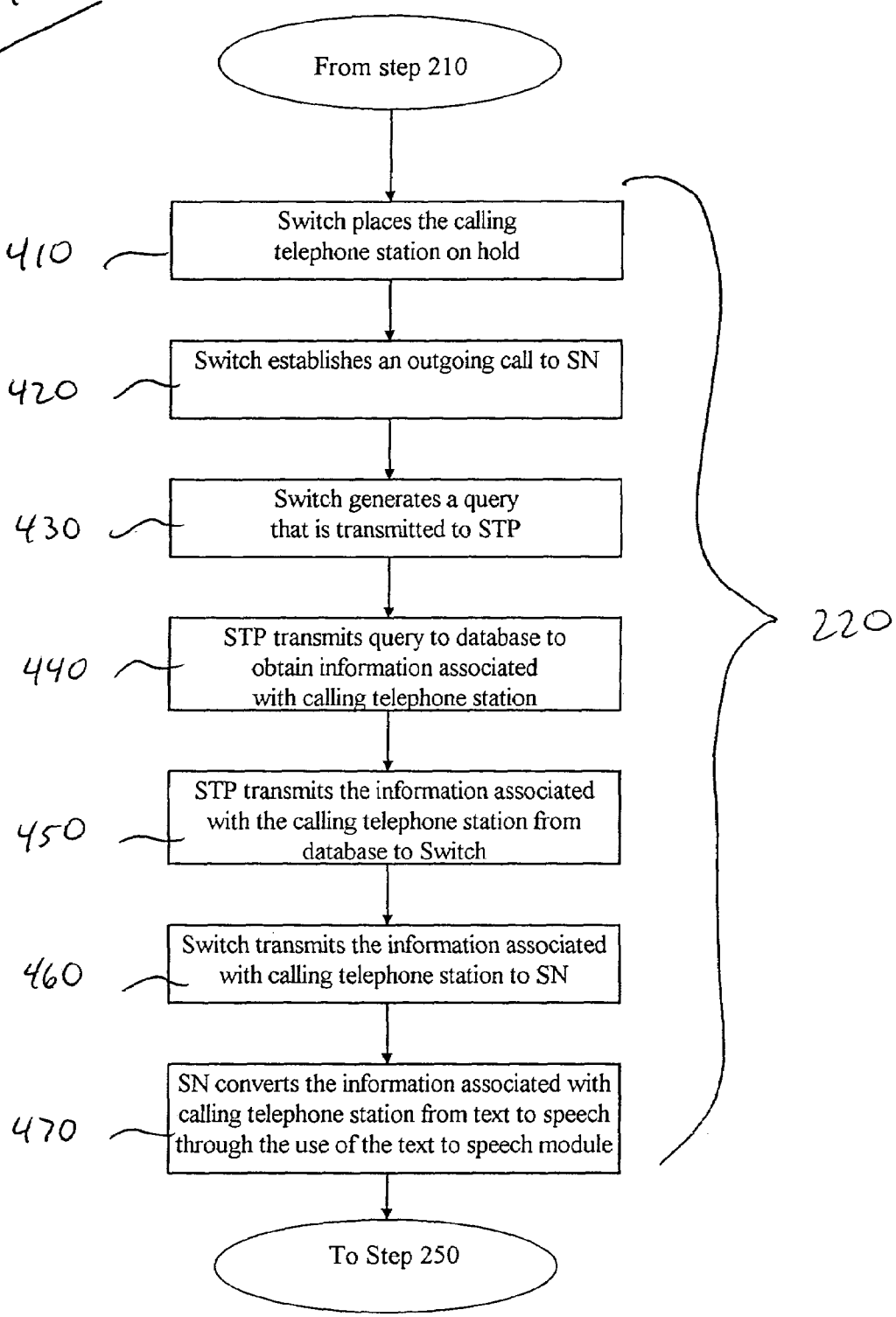
FIG. 10 is a more detailed flow chart of the method depicted in FIG. 4.

In an alternative embodiment of the method depicted in FIG. 4, the act of obtaining information associated with the calling telephone stating (step 220, FIG. 4) can comprise the acts depicted in FIG. 10. In response to a call being place from the calling telephone station 342 to the called telephone station 322, the call is routed from CO 340 to CO 320. After receiving the call, CO 320 can temporarily place the calling telephone station 342 on hold (step 410) and can establish an outgoing call to SN 360 (step 420). The CO 320 can establish the call to SN 360 by dialing a certain telephone number, which essentially creates a three-way call between the calling telephone station 342, the called telephone station 322, and the SN 360. This establishes a connection between the called telephone station 322 and the SN 360. The CO 320 can also automatically generate a query that is transmitted to the STP 370 (step 430), to obtain information associated with the calling telephone station 342. The query preferably contains the ten digit telephone number associated with the calling telephone station 342 and requests caller identification information associated with that telephone number.

After receiving the query from the CO 320, the STP 570 can transmit the query to the database 362 (step 440) to obtain information associated with calling telephone station 342 that is store within database 362. After the information has been retrieved from the database 362, the STP 370 can transmit the information to CO 320 (step 450). The CO 320 can transmit the information to the SN 360 (step 460). The information can then be converted from a text format to an audible format (step 470) through the use of the text to speech module 364.

Figure 11:
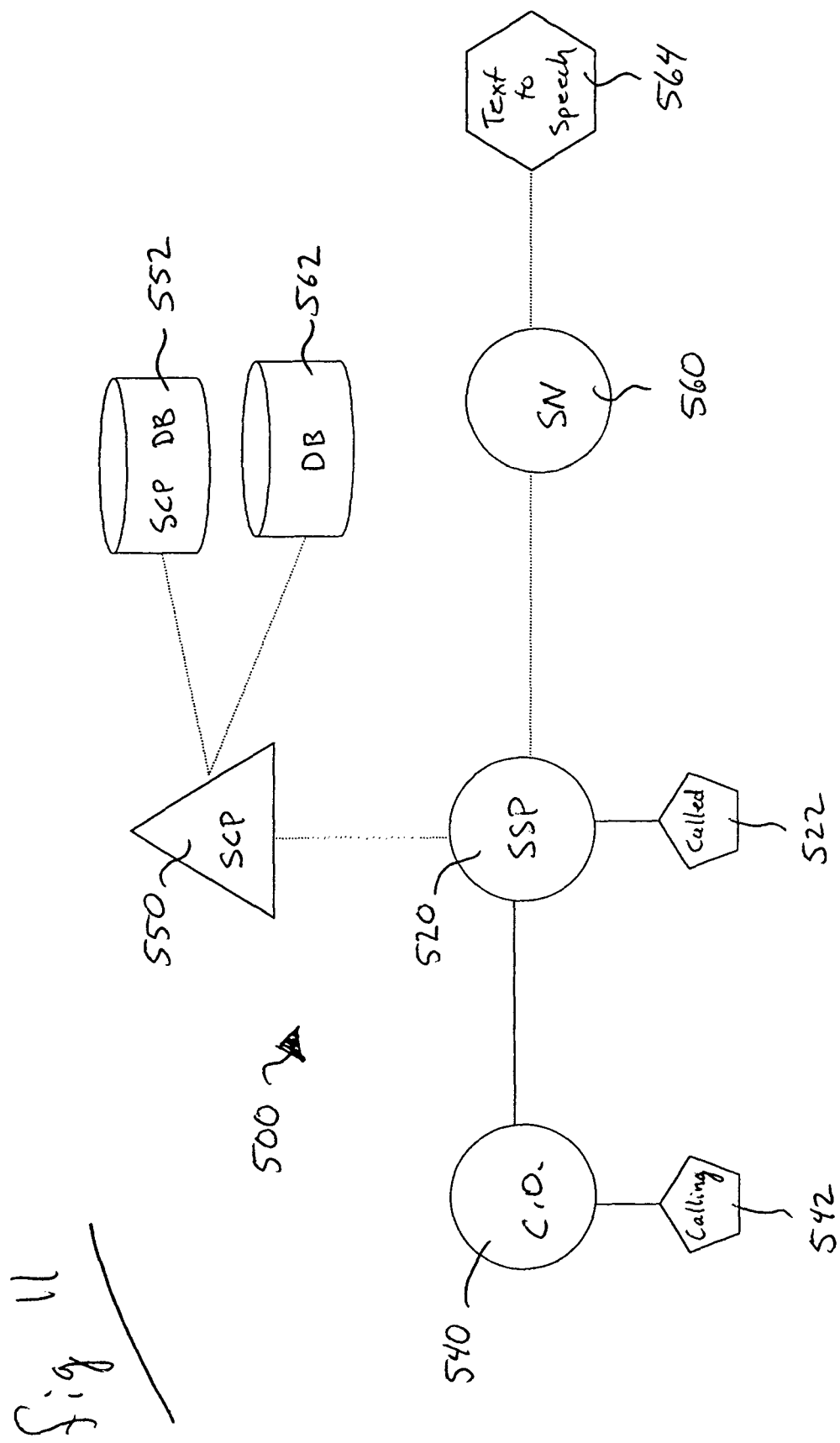
FIG. 11 is a more detailed block diagram of the system depicted in FIG. 1

Referring now to FIG. 11, a further alternative embodiment of the system of FIG. 1 is shown. The system 500, comprises an SSP 520, a called telephone station 522, central office 540, a calling telephone station 542, an SCP 550, an SCP database 552, a service node (SN) 560, a database 562, and a text-to-speech module 564, all as described above in reference to FIG. 2. In this embodiment, the database 562 is coupled with the SCP 550. The SCP 550 can access the information stored within database 562 and can forward that information through the system 500. For example, the SCP 550 can retrieve information associated with a telephone number from the database 562 to provide caller identification services to the called telephone station 522. In an alternative embodiment, the SCP database 552 and the database 562 can comprise a single database. The SSP 520 is preferably coupled with SCP 550 and SN 560 through the SS7 signaling protocol or the like. The SSP 520 can alternatively be coupled with the SN 560 through a primary rate interface line (PRI) or the like. In a further alternative embodiment, an intelligent peripheral (IP) 561, as described above in reference to FIG. 3, can be used in place of the SN 560. This system 500 can be used to perform the method described below.

In an alternative embodiment of the method depicted in FIG. 4, the act of obtaining information associated with the calling telephone stating (step 220, FIG. 4) can comprise the acts depicted in FIG. 12. In response to a call being place from the calling telephone station 542 to the called telephone station 522, the call is routed from central office 540 to SSP 520. After receiving the call, SSP 520 can temporarily place the calling telephone station 542 on hold (step 610) and can establish an outgoing call to SN 560 (step 620). The SSP 520 can establish the call to SN 560 by dialing a certain telephone number, which essentially creates a three-way call between the calling telephone station 542, the called telephone station 522, and the SN 560. This establishes a connection between the called telephone station 522 and the SN 560. The SSP 520 can also automatically generate a query that is transmitted to SCP 550 (step 630), to obtain information associated with the calling telephone station 542. The query preferably contains the ten digit telephone number associated with the calling telephone station 542 and requests caller identification information associated with that telephone number.

After receiving the query from the SSP 520, the SCP 550 can access database 562 (step 640) to obtain information associated with calling telephone station 542. After retrieving the information, SCP 550 can transmit the information to SSP 520 (step 650). SSP 520 can transmit the information to SN 560 (step 660). The information can then be converted from a text format to an audible format (step 670) through the use of the text to speech module 564.

In an alternative embodiment to the methods depicted in FIGS. 10 and 12, prior to transmitting the information to SN 360, 560 (step 460, 660), CO 320 or SSP 520 can determine whether any restrictions or exceptions are present that effect or prevent the transmission of caller identification information to the called telephone station 322, 522. If any such restrictions or exceptions are present, an alternative audible message can be transmitted to the called telephone station 322, 522. For example, if the calling party at the calling telephone station 342, 542 has restricted the transmission of caller identification information, an audible representation of the state in which the calling telephone station 342, 542 is located, or any other suitable alternative message, can be transmitted to the called telephone station 322, 522. In a preferred embodiment, the CO 320 or SSP 520 determines whether any restrictions or exceptions are present after receiving the information from the STP 370 or the SCP 550. Alternatively, the CO 320 or SSP 520 can determine whether such conditions are present prior to initiating a query or both prior to and after initiating the query.

In a further alternative embodiment, the methods described above and depicted in FIGS. 10 and 12, can be used in conjunction with other telephone services. One such service is "Wait and See" offered by Ameritech Corp., which provides a called party who is engaged in a first call with caller ID information in the form of a text message for a waiting second call. This information can be provided to the called party through a display in the called party's telephone equipment, for example. The CO 320 or SSP 520 can determine whether the called party has any such additional services and can alter the processing of the call accordingly. For example, when a called party has both services as described above, a default can be set in the CO 320 or SSP 520 such that one service always takes precedent over the other. Alternatively, the CO 320 or SSP 520 can determine whether the called party's telephone equipment, which is used in conjunction with any additional service, is activated. The CO 320 or SSP 520 can provide one type of service if the equipment is activated, or it can provide a different type of service if the equipment is not activated. One way to implement such a service is with an SSP that can dial one number to the SN 360, 560, as described above, to initiate one service or to dial a second number to the SN 360, 560 to initiate a second service.

In an alternative embodiment to the systems depicted in FIGS. 9 and 11, the system 700, as depicted in FIG. 13, can include a hub switch 790 that can be used in conjunction with the called party's switch 720. In this embodiment, the called telephone station 722 is connected to the switch 720, which can comprise an AIN switch, such as an SSP, or a non-AIN switch, such as a central office, as described herein. The switch 720 is coupled with the publicly switched telephone network (PSTN) 796 and the hub switch 790. The hub switch 790 can comprise an AIN switch, such as an SSP, or a non-AIN switch, such as a central office, as described herein. The hub switch 790 can be coupled with one or more SCPs 750, one or more SNs 760, and/or one or more databases 782.

An SCP database 762 is coupled with the SCP 750 and a database 782 is preferably coupled with the STP 770. The SCP database 762 and the database 782 preferably contain call control information or other information associated with telephone numbers. For example, the SCP database 762 and the database 782 can comprise a caller identification with name database, a caller assistance database, or any suitable database. The hub switch 790 preferably serves as a connection platform for the SCP 750, SN 760, and/or database 782 that are used to provide telephone services to the called party 722. Accordingly, in a preferred embodiment, the called party's switch 720 is preferably connected to one or more telephone stations, such as the called telephone station 722, and is not directly connected to the SCP 750, SN 760, or database 782. Also, in a preferred embodiment, the hub switch 790 is preferably connected to the SCP 750, SN 760, and/or database 782 and is not directly connected to telephone stations.

In operation, a call from a calling telephone station 742 is routed through the PSTN 796 to the called party's switch 720. If the called party is busy on another call, the switch 720 automatically places the calling telephone station 742 on hold and initiates a call to the hub switch 790. When the call reaches the hub switch 790, an AIN or non-AIN query is generated by the hub switch 790. This enables the hub switch 790 to receive information stored in the SCP database 762 or the database 782. Upon receipt of such information, the hub switch 790 can use the information to provide telephone services to the called telephone station 722. For example, the hub switch 790 can receive caller identification information from the SCP database 762 or the database 782. The hub switch 790 can also use the features of the SN 760, such as text-to-speech capabilities, to provide audible caller identification information. Accordingly, the hub switch 790 and the SN 760 can provide audible caller identification information to the called telephone station 722, in the form of audible call waiting, as described herein.

The present embodiments provide an efficient and effect method and system for providing an audible call waiting notification to a customer who is busy on a previous call. The present embodiments notify the customer that a current call is waiting in an effective manner that reduces confusion. Confusion is reduced by the combination of audible call waiting indicators and an audible representation of information associated with the calling telephone station. Additionally, both the indicator and the representation of the information can be provided automatically without significant delay and without any input from the caller.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

The invention claimed is:

1. A method for processing a call from a calling communication station to a called communication station, the method comprising:
   (a) receiving a current call at a called party's switch;
   (b) determining that the called communication station is busy on a previous call;
   (c) transmitting information from the called party's switch to a hub switch if the called communication station is busy on the previous call, wherein the hub switch is other than a service node;
   (d) using the hub switch to generate a query that requests information associated with the calling communication station, the query to direct a signal transfer point to obtain information from a database;
   (e) obtaining information associated with the calling communication station from the signal transfer point in response to the query; and
   (f) transmitting the information associated with the calling communication station to the called communication station.

2. The method of claim 1, wherein (c) comprises initiating an outgoing call from the called party's switch to the hub switch.

3. The method of claim 1, wherein (e) comprises obtaining information associated with the calling communication station from a database in response to the query.

4. The method of claim 1, wherein (e) comprises obtaining information associated with the calling communication station from a caller identification with name database in response to the query.

5. The method of claim 1, wherein (e) comprises obtaining an identity of a caller at the calling communication station in response to the query.

6. The method of claim 1, wherein (e) comprises obtaining a telephone number associated with the calling communication station in response to the query.

7. The method of claim 1, wherein (e) comprises obtaining an identity of a caller at the calling communication station and a telephone number associated with the calling communication station in response to the query.

8. The method of claim 1, wherein (f) comprises automatically transmitting an audible representation of the information associated with the calling communication station to the called communication station.

9. The method of claim 1, wherein (f) comprises automatically transmitting a textual representation of the information associated with the calling communication station to the called communication station.

10. The method of claim 1, further comprising transmitting an audible call waiting indicator to the called communication station prior to (f).

11. The method of claim 1, further comprising transmitting a single tone to the called communication station prior to (f).

12. The method of claim 1, further comprising transmitting one tone to the called communication station prior to (f) and transmitting one tone to the called communication station after (f).

13. A system for processing a call from a calling communication station to a called communication station, the system comprising:

a called party's switch having the called communication station coupled thereto, the called party's switch being operative to receive a current call, determine that a called communication station is busy on a previous call, and transmit information to a hub switch if the called communication station is busy on a previous call, wherein the hub switch is other than a service node;

the hub switch being coupled with the called party's switch and being operative to generate a query that requests information associated with the calling communication station from at least one of a signal transfer point and a service control point;

the signal transfer point coupled with the hub switch, the signal transfer point operative to receive the query from the hub switch and obtain information associated with the calling communication station from a database in response to the query; and the service control point coupled with the hub switch, the service control point being operative to receive the query from the hub switch, obtain information associated with the calling communication station in response to the query, and transmit the information associated with the calling communication station to a destination.

14. The system of claim 13, further comprising a service node coupled with the hub switch, the service node being operative to transmit an audible representation of the information associated with the calling communication station to the called communication station.

15. The system of claim 13, further comprising an intelligent peripheral coupled with the hub switch, the intelligent peripheral being operative to transmit an audible representation of the information associated with the calling communication station to the called communication station.

16. The system of claim 13, further comprising a caller identification with name database coupled with the service control point.

17. A method for processing a call, the method comprising:
(a) receiving a current call at a called party's switch;
(b) determining that a called communication station is busy on a previous call;
(c) initiating an outgoing call from the called party's switch to a hub switch if the called communication station is busy on the previous call, wherein the hub is other than a service node;
(d) using the hub switch to generate a query that requests information associated with the calling communication, the query to direct a signal transfer point to obtain information from a database;
(e) transmitting the query to the signal transfer point;
(f) using the signal transfer point services to obtain information associated with the calling communication station from the database; and
(g) transmitting the information associated with the calling communication station to the called communication station.

18. The method of claim 17, wherein (f) comprises obtaining an identity of a caller at the calling communication station and a telephone number associated with the calling communication station in response to the query.

19. The method of claim 17, wherein (g) comprises automatically transmitting an audible representation of the information associated with the calling communication station to the called communication station.

20. The method of claim 17, wherein (g) comprises automatically transmitting a textual representation of the information associated with the calling communication station to the called communication station.

21. The method of claim 17, further comprising transmitting an audible call waiting indicator to the called communication station prior to (g).

* * * * *